US011395492B2

(12) United States Patent
Hall et al.

(10) Patent No.: US 11,395,492 B2
(45) Date of Patent: Jul. 26, 2022

(54) ANTIMICROBIAL AND AGROCHEMICAL COMPOSITIONS (71) Applicant: Myco Sciences Limited, Buckinghamshire (GB)

(72) Inventors: Tony John Hall, London (GB); Sarah Gurr, Exeter (GB)

(73) Assignee: VM Agritech Limited, Buckinghamshire (GB)

( * ) Notice: Subject to any disclaimer, the term of this patent is extended or adjusted under 35 U.S.C. 154(b) by 399 days.

(21) Appl. No.: 15/580,287

(22) PCT Filed: Jun. 7, 2016

(86) PCT No.: PCT/US2016/036194
§ 371 (c)(1),
(2) Date: Dec. 7, 2017

(87) PCT Pub. No.: WO2016/200795
PCT Pub. Date: Dec. 15, 2016

(65) Prior Publication Data
US 2019/0090492 A1 Mar. 28, 2019
US 2020/0154713 A9 May 21, 2020

Related U.S. Application Data (60) Provisional application No. 62/172,501, filed on Jun. 8, 2015.

(51) Int. Cl.
A01N 59/20 (2006.01)
A01N 59/16 (2006.01)
A01N 59/26 (2006.01)
C01B 25/163 (2006.01)
C01G 3/06 (2006.01)
C01G 3/10 (2006.01)
C01G 9/06 (2006.01)
C01G 9/00 (2006.01)

(52) U.S. Cl.
CPC ............ A01N 59/20 (2013.01); A01N 59/16 (2013.01); A01N 59/26 (2013.01); C01B 25/163 (2013.01); C01G 3/06 (2013.01); C01G 3/10 (2013.01); C01G 9/00 (2013.01); C01G 9/06 (2013.01)

(58) Field of Classification Search
CPC ......... A01N 59/20; A01N 59/16; A01N 59/26
See application file for complete search history.

(56) References Cited

U.S. PATENT DOCUMENTS

| 1,905,532 | A | * | 4/1933 | Vannah .................. A01N 59/20 424/637 |
| 1,988,752 | A | | 1/1935 | Sessions |
| 2,414,660 | A | | 1/1947 | Nikitin |
| 2,540,209 | A | | 2/1951 | Nikitin |
| 4,048,324 | A | | 9/1977 | Kohn |
| 4,049,801 | A | | 9/1977 | Debourge et al. |
| 4,075,324 | A | | 2/1978 | Thizy |
| 4,193,993 | A | | 3/1980 | Hilditch |
| 4,544,666 | A | | 10/1985 | Thirumalachar |
| 4,622,248 | A | | 11/1986 | Leach |
| 4,675,431 | A | | 6/1987 | Privitizer |
| 4,952,398 | A | | 8/1990 | Tapin |
| 5,373,025 | A | | 12/1994 | Gay |
| 5,736,164 | A | | 4/1998 | Taylor |
| 6,168,643 | B1 | | 1/2001 | Hsu |
| 6,340,384 | B1 | | 1/2002 | Walker |
| 6,896,908 | B2 | | 5/2005 | Lloyd et al. |
| 6,942,878 | B2 | | 9/2005 | Ishii et al. |
| 7,060,302 | B1 | | 6/2006 | Hickok |
| 8,012,511 | B1 | | 9/2011 | Cummins et al. |
| 8,067,403 | B2 | | 11/2011 | Whiteford et al. |
| 8,206,732 | B2 | | 6/2012 | Nelson |
| 8,221,796 | B2 | | 7/2012 | Martinez |
| 8,273,791 | B2 | | 9/2012 | Ramirez et al. |
| 8,287,893 | B2 | | 10/2012 | Crudden |
| 8,293,282 | B2 | | 10/2012 | Patel |
| 8,491,812 | B2 | | 7/2013 | Moore |
| 9,474,282 | B2 | | 10/2016 | Hall |
| 2002/0193351 | A1 | | 12/2002 | Taylor |
| 2004/0001791 | A1 | | 1/2004 | Zeiler |
| 2004/0258838 | A1 | | 12/2004 | Richardson |
| 2006/0089342 | A1 | | 4/2006 | Gavin et al. |
| 2006/0159772 | A1 | * | 7/2006 | Garavaglia ............ A01N 37/46 424/604 |
| 2007/0275101 | A1 | | 11/2007 | Lu et al. |

(Continued)

FOREIGN PATENT DOCUMENTS

| CN | 1076080 A | 9/1993 |
| CN | 1826899 A1 | 9/2006 |
| DE | 2807293 A1 | 8/1979 |
| EP | 0136137 A2 | 4/1984 |
| EP | 0125137 A2 | 11/1984 |

(Continued)

OTHER PUBLICATIONS

"Copper oxychloride fungicide and its effect on growth and oxidative stress of potato plants," Ferreira et al., Pesticide Biochemistry and Physiology, vol. 112, Jun. 2014, pp. 63-69, May 8, 2014. EFS file name: 20190114_15-580287_IDS_NPL_Cite 1.

(Continued)

Primary Examiner — Michael B. Pallay
(74) Attorney, Agent, or Firm — John M. Hammond; Patent Innovations LLC (57) ABSTRACT In accordance with, the present invention, there is provided an antimicrobial composition comprising an aqueous solution containing copper and/or zinc ions, optionally a hydroxide salt, and phosphorous acid. The composition, is additionally sporicidal and sclerticidal when combined with a salt of nitrous acid such as sodium nitrite. The present invention may also include chemicals containing the phosphite or phosphonaie group (PO/l which can inhibit the formation of scierotia at concentrations that are readily achievable for agricultural applications. Compositions of the present invention, inhibit, scierotia formation by fungi and may therefore be used in the field to prevent the continuation and advancement of pathogenie fungi.

13 Claims, 3 Drawing Sheets (56) References Cited

U.S. PATENT DOCUMENTS

| | | | |
|---|---|---|---|
| 2008/0004177 | A1 | 1/2008 | Pfeiffer et al. |
| 2008/0166424 | A1 | 7/2008 | Mixon |
| 2009/0226494 | A1 | 9/2009 | Hickok |
| 2010/0015245 | A1 | 1/2010 | Harrison et al. |
| 2010/0129474 | A1* | 5/2010 | Benjamin ............. A01N 59/00 424/718 |
| 2012/0021911 | A1 | 1/2012 | Majure et al. |
| 2013/0079228 | A1* | 3/2013 | Freed .................... A01N 25/02 504/206 |
| 2013/0309517 | A1 | 11/2013 | Pallaske |
| 2014/0213544 | A1 | 7/2014 | Majure |
| 2015/0118326 | A1 | 4/2015 | Teerlink |
| 2015/0119361 | A1 | 4/2015 | Schutz et al. |
| 2015/0164085 | A1 | 6/2015 | Hall |
| 2016/0192643 | A1 | 7/2016 | Stark |

FOREIGN PATENT DOCUMENTS

| | | |
|---|---|---|
| EP | 0136137 A1 | 4/1985 |
| EP | 0136173 A2 | 4/1985 |
| EP | 2286666 A1 | 2/2011 |
| FR | 1544172 A1 | 9/1968 |
| GB | 1119058 A1 | 7/1968 |
| GB | 2077740 A1 | 12/1981 |
| JP | H0680527 A | 3/1994 |
| JP | 2006282553 A1 | 10/2006 |
| JP | 2013231001 A | 11/2013 |
| JP | 2013231001 A1 | 11/2013 |
| WO | 8504668 A1 | 10/1985 |
| WO | 91/13552 A1 | 9/1991 |
| WO | 02060248 A2 | 8/2002 |
| WO | 02096202 A1 | 12/2002 |
| WO | 2006128677 A2 | 12/2006 |
| WO | 2007017220 A2 | 2/2007 |
| WO | 2007045256 A1 | 4/2007 |
| WO | 2008035079 A2 | 3/2008 |
| WO | 2009055799 A2 | 4/2009 |
| WO | 2009082206 A1 | 7/2009 |
| WO | 2015089358 A1 | 6/2015 |

OTHER PUBLICATIONS

"Effect of postinfection application of phosphorous (phosphonic) acid on the incidence and sporulation of Plasmopara viticola on grapevine," Wick et al., Faculty of Engineering and Information Sciences—Papers: Part A, University of Wollongong Australia, 1991. EFS file name: 20190114_15-580287_IDS_NPL_Cite2.

"A Progress Report on the Effect of Zinc as a Constituent of Potato Fiungicides," Callbeck, L. C., American Potato Journal, vol. 31, pp. 341-348, Apr. 20, 1954. EFS file name: 20190114_15-580287_IDS_NPL_Cite3.

"Ultrastructure and Development of Sclerotia of Botrytis cinerea Pers. in vitro," Nair et al., Journal of Phytopathology, vol. 119, Issue1, May 1987. EFS file name: 20190114_15-580287_IDS_NPL_Cite4.

Nufarm Oxydul(R) DF Fungicide product information, Dec. 4, 2009. EFS file name: 20190114_15-580287_IDS_NPL_Cite5.

ChemDemos (2012), Copper-Ammonia Complex, pp. 1-3. EFS file name: 20190116_15-580287_IDS_NPL_Cite1.

Labnet International, Inc. (2010), Instruction Manual, pp. 1-12. EFS file name: 20190116_15-580287_IDS_NPL_Cite2.

Hall et al., Biocides for laundry decontamination, Focus on Detergency, Feb. 2010, pp. 8-10, vol./issue NA, Household and Personal Care Today. United Kingdom. EFS file name 20190116_15-580287_IDS_NPL_Cite3.

Hamilton et al., Performance of ultramicrofibre cleaning technology with or without addition of a novel copper-based biocide, Journal of Hospital Infection, Oct. 12, 2009 . . . pp. 62-71, vol. 74, Elsevier, published on-line. EFS file name 20190116_15-580287_IDS_NPL_Cite4.

Hall et al., Decontamination of laundry at low temperature with CuWB50, a novel copper-based biocidal compound, American Journal of Infection Control, Aug. 2009, pp. 478-483 . . . vol. 37, No. 6, the Association for Professionals in Infection Control and Epiemiology, Inc., published on-line. EFS file name 20190116_15-580287_IDS_NPL_Cite5.

Gant, Novel copper-based biocides: efficacy against multiresistant Acinetobacter in an ICU environment, published online Aug. 3, 2007. EFS file name 20190116_15-580287_IDS_NPL_Cite6.

Gant et al.,Three novel highly charged copper-based biocides:safety and efficacy against healthcare-associated organisms,Journal of Antimicrobial Chemotherapy,Jun. 13, 2007 . . . pp. 294-299, vol. 60, Oxford University Press. EFS file name 20190116_15-580287_IDS_NPL_Cite7.

Hall et al.,A comparison of the antibacterial efficacy and cytotoxicity to cultured human skin cells of 7 commercial hand rubs and Xgel,a new copper-based biocidal hand rub . . . The American Journal of Infection Control, 2009, pp. 322-326, vol. 37, No. 4, the Association for Professionals in Infection Control and Epidemiology, Inc. Published on-line. EFS file name 20190116_15-580287_IDS_NPL_Cite8.

Hall et al., A UK district general hospital cleaning study: a comparison of the performance of ultramicrofibre technology with or without addition of a novel copper-based . . . biocide with standard hypochlorite-based cleaning, Journal of Infection Prevention, Nov. 2011, pp. 232-236, vol. 12, No. 6, Sage Publishing, U.K. EFS file name 20190116_15-580287_IDS_NPL_Cite9.

Gant et al., Letters to the Editor, The Hospital Infection Society, Nov. 14, 2009, pp. 82-84, vol. issue unknown, Elsevier, published on-line. EFS file name 20190116_15-580287_IDS_NPL_Cite10.

Moore et al., The efficacy of the inorganic copper-based biocide CuWB50 is compromised by hard water, Letters in Applied Microbiology, Feb. 28, 2008, pp. 655-660, vol. 46, . . . The Society for Applied Microbiology, Published on-line. EFS file name 20190116_15-580287_IDS_NPL_Cite11.

Hall et al., Effect of the dried residues of two hand gels on the survival of meticillin-resistant *Staphylococcus aureus* and Acinetobacter calcoaceticus-baumannii, . . . Journal of Infection Prevention, May 2010, pp. 70-73, vol. 2, No. 3, Sage Publications, Published on-line. EFS file name 20190116_15-580287_IDS_NPL_Cite12.

Hall et al., A hospital cleaning study using microfibre and a novel copper biocide. I. Microbiological studies, Journal of Infection Prevention, Sep. 2011, pp. 188-194, . . . vol. 12, No. 5, Sage Publications, Published on-line. EFS file name 20190116_15-580287_IDS_NPL_Cite13.

Wren et al., Removing bacteria from hospital surfaces:a laboratory comparision of ultramicrofibre and standard cloths, Journal of Hospital Infection, Sep. 17, 2008, vol. 70 . . . pp. 265-271, Elsevier Ltd., Published on-line. EFS file name 20190116_15-580287_IDS_NPL_Cite14.

"Practical Pesticide Handbook", Henan Agricultural Technology Promotion Main Station, pp. 181-182, Henan Science and Technology Press, as cited in Patent Appl. No. 2016800361149 in Chinese Patent Office (SIPO). Alleged publication date Dec. 31, 1982. EFS file name 20200312_15-580287_IDS_NPL_Cite1.

Brunings et al., "Are Phosphorous and Phosphoric Acids Equal Phosphorous sources for Plant Growth?" University of Florida Institute of Food and Agricultural Sciences. Original publication date Apr. 2005. Revised Mar. 2012, Jan. 2015. Obtained on Oct. 15, 2015 at https://edis.ifas.ufl.edu/pdffiles/HS/HS25400.pdf. EFS file name: 20190115_15-580287_IDS_NPL_Cite1.

Written Opinion in PCT Application No. IB2015/001259, dated Oct. 19, 2015. EFS file name: 20190115_15-580287_IDS_NPL_Cite2.

Office Action in U.S. Appl. No. 14/106,676 of Hall, dated Jul. 7, 2015. EFS file name: 20190115_15-580287_IDS_NPL_Cite3.

Office Action in U.S. Appl. No. 14/106,676 of Hall, dated Jan. 11, 2016. EFS file name: 20190115_15-580287_IDS_NPL_Cite4.

Westerhuis, d., "An invitro study into the effect of glyphosate on Sclerotium rolfsii," Australasian Plant Disease Notes. 2007, vol. 2, pp. 23-24. EFS file name 20210311_15-580287_IDS_NPL_Cite1.

\* cited by examiner

| Phosphorous acid | Potassium phosphate | Glyphosate or N-phosphonomethyl glycine | Aminomethyl phosphonic acid (AMPA) |
|---|---|---|---|
|  |  |  |  |

PRIOR ART

ANTIMICROBIAL AND AGROCHEMICAL COMPOSITIONS

CROSS-REFERENCE TO RELATED APPLICATIONS

This application claims priority to U.S. Patent Application Ser. No. 62/172,501 filed Jun. 8, 2015 entitled "Antimicrobial and Agrochemical Compositions" by Dr. Tony John Hall, the entire disclosure of which is incorporated herein by reference as permissible by national or regional laws.

TECHNICAL FIELD

This invention relates generally to antimicrobial compositions that also inhibit fungal sclerotia formation, and more specifically to aqueous compositions comprising copper ions with or without zinc ions, a hydroxide salt and phosphorous acid as active ingredients. The compositions are additionally sporicidal and seleroticidal when combined with salts of nitrous acid such as sodium nitrite. The compositions are inhibitors of fungal sclerotia formation by virtue of their containing phosphorous acid with a phosphite or phosphonate ($PO_3^{3-}$) group.

BACKGROUND ART

The globalization of agriculture has lead to crop plants being grown in areas where they may be exposed to new pathogens or new strains of existing pathogens, such as fungi and bacteria, to which they are susceptible. It is estimated that 70% of all major crop diseases are caused by phytopathogenic fungi and it is now acknowledged that plant diseases threaten food supplies worldwide.

The development of commercial antifungal agents in agriculture began with copper-based Bordeaux mixture in the $19^{th}$ century. In the $20^{th}$ century, many new classes of synthetic organic fungicides with defined modes of action were produced, but the development of fungal resistance to many of these agents has been an increasing problem. In addition, many of these fungicides have toxic effects on the environment or on other species, and they can persist in crops and enter the food chain. Consequently, there is a growing need for new fungicides that are safer for the environment and the consumer.

Many fungi are disseminated in the form of spores and phytopathogenic fungi whose spores are spread by the wind are responsible for some of the most damaging crop diseases, for example, coffee rust (*Hemileia vastatrix*), rice blast (*Magnaporthe oryzae*) and black sigatoka (*Mycosphaerella fijensis*) on banana plants. Fungal (and bacterial) spores are highly resistant to cold, heat, ultraviolet light and most fungicides. In fact, most spores are so resistant that chemicals such as hypochlorous acid (bleach) and hydrogen peroxide, which are sporicidal at high concentrations (e.g. 5-10% and >10%, respectively), are also highly damaging to plants, animals and even the built environment at these sporicidal concentrations.

In addition to spores as a means of dissemination and survival, many fungi can produce survival structures called sclerotia that represent an important source of phytopathogenic diseases attributed to *Rhizoctonia, Verticillium, Sclerotinia* and *Macrophormina* species. Sclerotia are asexual, multicellular, dormant and highly chemically-resistant structures. Sclerotia are usually melanized, which affords them resistance to ultraviolet light exposure and, consequently, they are often identified as black spots or bodies in the soil or on plants, fruits and vegetables. Once sclerotia are present in the soil they can survive for many years, infecting newly planted crops when contact is made with plant roots leading to sclerotial germination and the growth of fungal hyphae that invade the plant via the roots. Consequently, a need exists for an environmentally safe and cost-effective product that can control sclerotia formation in agriculture.

Copper-based fungicides are still extensively used in agriculture today, including organic farming, since they are widely available, inexpensive and relatively safe to use. In addition, fungal resistance to copper-based products is low because copper exerts multiple toxic effects including cell membrane damage and inactivation of iron-sulfur clusters of dehydratase enzymes. However, currently available copper-based products are suspensions of copper compounds, such as copper hydroxide and copper oxychloride, which are used preventatively by sticking to the leaves of plants to prevent fungal development. These copper-based fungicides require frequent application and contain relatively large amounts of copper—foliar sprays of Bordeaux mixture and copper oxychloride products typically contain 2.5 grams/liter of elemental copper—because they provide little ionic copper which is the fungicidal/bactericidal form of copper.

Phosphorous acid in the form of salts, such as potassium phosphite, is classified as a biopesticide by the US Environmental Protection Agency, Phosphites have both direct and indirect modes of action against oomycetes and fungi. Direct effects include inhibition of mycelial growth, and suppression of sporulation and germination. Indirect effects of phosphites include the activation of plant defence responses by mechanisms that are not yet fully elicidated. Phosphites have low toxicity, and like copper-based fungicides, they have the advantage of being inexpensive, relatively safe to use and by acting via multiple sites of action avoid the development of resistance.

Global health and environmental regulations are becoming increasingly stringent with respect to pesticide residues. Thus, farmers around the world face the dilemma of the need to control destructive pathogens, which requires more fungicide/bactericide use, whilst regulatory agencies are demanding less chemical residue on crops and in the soil. Phytopathogenic fungi spread by spores present a particularly difficult target and currently there are no commercially available proven sporicidal products. It is evident that if spores could be killed/inactivated on infected plants before release into the air this would prevent their spread and lead to effective disease control.

Therefore, a need exists for effective and safe sporicidal agricultural compositions that are non-phytotoxic. It is known that the reaction between acids and sodium nitrite leads to the generation of highly reactive nitrogen oxides that have antimicrobial and sporicidal activity. Experiments carried out by the inventor using compositions containing copper and/or zinc ions and phosphorous acid combined with sodium nitrite surprisingly revealed synergistic antifungal, sporicidal and scleroticidal activities compared to copper and/or zinc ions alone or phosphorous acid alone combined with sodium nitrite. Importantly, these compositions when combined with sodium nitrite were not phytotoxic at sporicidal/scleroticidal concentrations. In addition, these compositions when combined with sodium nitrite advantageously have both a short-lived (up to around 6 hours) sporicidal/scleroticidal activity and extended (days to weeks) antifungal and plant defense-inducing effects. Furthermore, these compositions can be made and used in a safe, cost-effective and environmentally friendly manner. The present invention describes such compositions.

*Rhizoctonia solani* (*R. solani*) is a widespread, soil-borne plant pathogenic fungus that causes root rot and damping off in many plant species, and black scurf on potato tubers. *R. solani* forms melanin-rich sclerotia that can survive for long periods in soil and act as the primary inoculum in newly planted crops. Whilst assessing the effects of compositions containing copper, zinc and phosphorous acid in fungal growth inhibition assays with *R. solani* that were usually examined after 1 to 2 days of culture, the inventor noted that in plates kept for more than week the formation and/or the maturation of scierotia was inhibited at concentrations of certain compositions that only partially inhibited the growth of *R. solani* after 1 to 2 days of culture. Such partially inhibited cultures usually become confluent after 2 to 4 days of culture and at this point, as nutrients become limiting, the fungus starts to produce sclerotia that first appear as white patches or bodies and then become melanized, mature black structures that remain viable for many months, even in culture plates that have dried out.

This unexpected observation was investigated further and the results presented here show that the presence of phosphorous acid in the compositions was responsible for the inhibition of sclerotia formation. Further experiments surprisingly revealed that widely used agrochemicals such as phosphorous acid, its salts e.g. potassium, phosphite, and the herbicide glyphosate (2-[(phosphonomethyl)amino] acetic acid), all of which contain the phosphite or phosphonate ($PO_3^{3-}$) group are all potent inhibitors of sclerotia formation.

BRIEF DESCRIPTION OF THE DRAWINGS

The invention will be described by reference to the following drawings, in which like numerals refer to like elements, and in which.

CuZn #31 was used at 1% of stock solution with sodium nitrite from 1 to 100 millimolar. Immature (white) and mature (black) sclerotia of *R. solani* were treated for 10 minutes and subsequent fungal growth on PDA was assessed after 2 days of culture. NG=no growth.

The results shown are the mean±S.D. from 3 separate experiments (HP and GP) and 2 separate experiments (AMPA).

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification and the attached drawings.

DISCLOSURE OF THE INVENTION

In accordance with the present invention, there is provided an antimicrobial, sporicidal and scleroticidal composition comprising an aqueous solution containing copper and/or zinc ions, optionally a hydroxide salt and phosphorous acid when combined with a salt of nitrous acid; in a preferred embodiment the salt of nitrous acid being sodium nitrite. The present invention includes, in some embodiments, chemicals containing the phosphite or phosphonate group ($PO_3^{3-}$) which can inhibit the formation of sclerotia at concentrations that are readily achievable for agricultural applications. Compositions of the present invention inhibit sclerotia formation by fungi and may therefore be used in the field to prevent the continuation and advancement of pathogenic fungi.

The foregoing paragraph has been provided by way of introduction, and is not intended to limit the scope of the invention as described in this specification and the attached drawings and claims.

BEST MODE FOR CARRYING OUT THE INVENTION

The present invention and the various embodiments described and envisioned herein include compositions, preparations, methods and uses for the heretofore unknown synergistic antimicrobial activity of compositions containing copper ions and/or zinc ions with phosphorous acid combined with salts of nitrous acid such as sodium nitrite. The present invention will be described by way of example, and not limitation. Modifications, improvements and additions to the invention described herein may be determined after reading this specification and viewing the accompanying drawings; such modifications, improvements, and additions being considered included in the spirit and broad scope of the present invention and its various embodiments described or envisioned herein.

Antimicrobial, as used herein, includes anti-bacterial, anti-fungal, anti-oomycete, and anti-pathogen. Sporicidal and scleroticida The antimicrobial, sporicidal and scleroticidal activity of the compositions described is surprisingly more potent than that of copper ions with or without zinc ions alone or phosphorous acid alone when combined with sodium nitrite. Importantly, these compositions are also not phytotoxic at effective antimicrobial, sporicidal and scleroticidal concentrations. Since the compositions contain copper and/or zinc ions and phosphorous acid, they also advantageously remain effective as anti-microbial and plant defense-stimulating chemicals after the sporicidal/scleroticidal reaction with sodium nitrite is exhausted (after around 6 hours).

One embodiment of the present invention relates to the surprisingly synergistic inhibition of the growth of plant pathogenic fungi, and sporicidal and scleroticidal activity of compositions containing copper ions with or without zinc ions and phosphorous acid when combined with a salt of nitrous acid, compared to the anti-fungal and sporicidal activity of solutions of copper ions with or without zinc ions alone or phosphorous acid alone, when combined with a salt of nitrous acid, preferably sodium nitrite.

In another embodiment of the present invention it is demonstrated that the aforementioned compositions containing cupper halts with or without zinc salts and phosphorous acid are surprisingly potent inhibitors of fungal sclerotia formation. Indeed, it is further and unexpectedly demonstrated that a variety chemicals containing the phosphite or phosphonate group ($PO_3^{3-}$) can inhibit the formation of sclerotia at concentrations that are readily achievable for agricultural applications. The chemicals notably include the fungicides potassium phosphite, phosphorous acid and Aliette, and the herbicide glyphosate, all of which are widely used agrochemicals.

The compositions containing copper ions with or without zinc ions and phosphorous acid are conveniently prepared according to the general procedure outlined below. These disclosed embodiments of the present invention exemplify certain preferred compositions; however, these examples are not intended to limit the scope of the present invention. As will be obvious to those skilled in the art, multiple variations and modifications may be made without departing from the spirit and broad scope of the present invention.

The antimicrobial compositions of the present invention comprise aqueous solutions of copper ions that are provided by copper oxychloride, two forms of which are: (1) The copper oxychloride Technical Product (CuOCl-TP) contains around 57% elemental copper and a 1% suspension in water has a pH of 6.2, (2) The copper oxychloride Wettable Powder (CuOCl-WP) contains around 50% elemental copper and a 1% suspension in water has a pH of 8.3. CuOCl-WP contains around 10% bentonite and surfactant to increases the "wettability" of the water-insoluble copper oxychloride so that it remains in suspension longer than CuOCl-TP. Copper ions in the compositions can also be provided from copper sulphate pentahydrate either mixed with CuOCl during the production of the composition, or made into a composition separately and mixed together with the CuOCl-based composition later.

The copper ions in the compositions can be with or without zinc ions, and phosphorous acid, with the optional addition of a hydroxide salt to control the acidity of the compositions. In this respect, the use of sodium hydroxide or potassium hydroxide sometimes led to instability (turbidity, crystallization) of compositions made with CuOCl-TP or copper sulfate, but not in compositions made with CuOCl-WP. Surprisingly, ammonium hydroxide could be used with all three copper compounds to control the acidity of the compositions without issues of turbidity or crystallization and it is, therefore, the preferred hydroxide for use in the compositions.

Some observations on a variety of such copper- and copper-zinc-based compositions are shown in Table 1. The results show, for example, that copper sulfate is preferable to copper chloride for the production of stable compositions. The results also surprisingly show that CuOCl-WP is preferable to copper CuOCl-TP for the production of copper-only compositions owing to instability (crystallization) of the latter. However, it was surprisingly found that the presence of zinc ions prevents instability (crystallization) in compositions made with CuOCl-TP.

The anti-microbial compositions of the present invention, and in particular the sporicidal and scleroticidal compositions of the present invention comprise (i) aqueous solutions of copper ions, with or without zinc ions, and phosphorous acid, with the option of addition of a hydroxide salt such as sodium hydroxide, potassium hydroxide and preferably ammonium hydroxide, and (ii) combination with a salt of nitrous acid, preferably sodium nitrite.

In one embodiment of the present invention, the antimicrobial composition includes a solution having copper oxychloride or copper sulfate pentahydrate with or without a zinc salt (preferably zinc sulfate) dissolved in water with phosphorous acid subsequently added to the solution, with the optional addition of a hydroxide salt (preferably ammonium hydroxide) to control the pH of the acidic copper or copper-zinc compositions thus formed. These solutions are designated, for example, Cu-31 or CuZn-43-N and Cu-32-N (N=with $NH_4OH$ added, see Table 2).

In one embodiment of the present invention, the antimicrobial composition includes a suspension having copper oxychloride-WP mixed in water with the addition of ammonium hydroxide before the phosphorous acid which enhances the precipitation of bentonite at low temperatures (20° C. to 50° C. (see the EXAMPLE below for more details)).

Copper oxychloride-based compositions are conveniently made using CuOCl-WP that contains copper oxychloride, bentonite and surfactant(s). It was found that the addition of phosphorous acid (i) solubilized CuOCl-WP to form a stable solution, and (ii) to a suspension of CuOCl-WP followed by incubation at 70° C. to 90° C. for 15 to 30 minutes encouraged the rapid precipitation of the bentonite component leaving a clear dark green, solution with or without the addition of ammonium hydroxide.

The following example describes the general protocol for making a 2X stock acid-solubilized copper oxychloride composition (Cu-32-2X) that can be used in turn to make formulations such as Cu-32 and Cu—Zn-32. Unless otherwise stated, all chemicals were obtained from Sigma-Al-

TABLE 1

Observations on the stability of a variety of copper and copper-zinc compositions with phosphorous acid ($H_3PO_3$) with or without the addition of ammonium hydroxide ($NH_4OH$) made and stored at room temperature (22° C.).

| Composition<br>$H_3PO_3$ at 17.5 g/dL<br>$NH_4OH$ (56.6% solution) at 2 ml/dL | Copper<br>Elemental copper at a concentration of 2.5 g/dL | Copper and Zinc<br>Elemental copper and elemental zinc both at a concentration of 1.25 g/dL | Conclusions |
| --- | --- | --- | --- |
| $CuSO_4·5H_2O$ ±<br>$ZnSO_4·7H_2O$ | Stable blue solution ± addition of ammonium hydroxide. | Stable blue solution ± ammonium hydroxide. | Copper sulfate-based compositions are preferable to those made with copper chloride. |
| $CuCl_2·2H_2O$ ±<br>$ZnSO_4·7H_2O$ | Crystallization starts within a few hours ± addition of ammonium hydroxide. | Signs of crystallization after a few days ± addition of ammonium hydroxide. | |
| CuOCl-TP* ±<br>$ZnSO_4·7H_2O$<br>*Technical product | Turbid blue solution with crystallization after a few days ± addition of ammonium hydroxide. | Slightly turbid blue solution without addition of ammonium hydroxide, but no crystallization in either case. | CuOCl-WP, but not CuOCl-TP, can be used to make stable copper-only compositions. |
| CuOCl-WP* ±<br>$ZnSO_4·7H_2O$<br>*Wettable powder | Clear green solation. Bentonite precipitates more effectively with addition of ammonium hydroxide at low temperatures e.g. 37° C. | Clear green solution. Bentonite does not precipitate out with or without the addition of ammonium hydroxide. | Stable CuZn compositions can be made with either CuOCl product. |

In the Table, gram or grams is abbreviated with the letter g, milliliter or milliliters is abbreviated with the letters ml, and decilitre is abbreviated with the letters dL.

drich Company Ltd., The old Brickyard, New Road, Gillingham, Dorset SP8 4XT, UK, unless otherwise stated. Hortiphyte was obtained from Hortifeeds, Park Farm, Park Farm Road, Kettlethorpe, Lincoln LN1 2LD, UK. Aliette (Fosetyl-aluminum) and Glyphosate (2-[(phosphonomethyl) amino] acetic acid) were obtained from Bayer CropScience, 230 Cambridge Science Park Milton Road, Cambridge CB4 0WB, UK. Aminomethyl phosphonic acid was obtained from Fisher Scientific UK, Bishop Meadows Road, LE115RG Loughborough, Leicestershire, UK. Potassium phosphite was purchased front Wuhan Risen Trading Ltd., 498 Jianshe Ave, Wuhan, China. Copper oxychloride 50-Wettable Powder (CuOCl-WP) and copper oxychloride-Technical Product (CuOCl-TP) were obtained from Manic a S.P.A., 4 Via all'Adige, 38068 Rovereto, Italy.

10.0 grams of CuOCl-WP (containing 50% elemental copper) is added to 70 milliliters of distilled water in a glass beaker; a magnetic stirrer and stir bar is used to mix and form a greenish-blue suspension. If the bentonite is to be precipitated out at low temperature (20° C. to 50° C.) then addition of 8.0 milliliters of ammonium hydroxide (56.6% solution) a this point to the CuOCl-WP suspension surprisingly will accelerate bentonite precipitation. 35.0 grams of phosphorous acid is gradually added resulting in the solubilization of CuOCl-WP to form a dark green solution which is stirred for a further 5 minutes and then made up to a volume of 90 milliliters with distilled water. The solution is then warmed, for example, to 37° C. for 24 hours or during which time the bentonite of the CuOCl-WP formulation precipitates out. The bentonite is removed by centrifugation, followed by decanting of the soluble composition. If the bentonite is to be precipitated at high temperature (e.g. 60° C. to 90° C.), at this point the pH of the acidic solution can be modified by the addition of ammonium hydroxide (1 to 80 milliliters/liter), and the total volume can then be finally adjusted to 100 milliliters with distilled water.

This Cu-32-2X concentrate can be mixed with other formulations to conveniently make a variety of other products. Thus, to make Ca-32, the 2× concentrate is mixed 1:1 with distilled water. To make CnZn-32, equal volumes of Cu-32 and Xn-32 (see Table 2) were combined with stirring.

It should be noted that CuOCl-TP cannot be used to make stable copper-only compositions by addition of phosphorous acid and optional neutralization with a basic ammonium salt, because such compositions made with CuOCl-TP (with or without addition of ammonium hydroxide) crystalline out within a few days (see Table 1). However, copper-zinc-based compositions made by making a suspension of CuOCl-TP and a zinc salt (preferably zinc sulfate) in water, followed by addition of phosphorous acid (with or without addition of ammonium hydroxide) are surprisingly stable compositions that advantageously do not show signs of crystallization even after several weeks and do not require time and/or heating to precipitate out bentonite as with the CuOCl-WP-based compositions described above (see Table 1).

Copper sulfate-containing compositions are preferably made with ammonium hydroxide.

Furthermore, copper- and copper-zinc-based compositions made with, copper oxychloride (-WP or -TP) can be combined with copper- and copper-zinc-based compositions made with copper sulfate in proportions ranging from 1:1 to 1:100 without any noticeable change in antimicrobial activity as illustrated with the various compositions made by combining Cn-31 and Cu-32 in differing ratios as shown in Table 2.

For copper- and copper-zinc-based compositions, it is preferred that the total concentration of elemental copper and zinc in the compositions is of the order 1 to 50 grams/liter.

In copper-zinc-based compositions, the ratio of elemental copper to elemental zinc concentrations may be of the order 100:1 to 1:100, preferably 10:1 to 1:10 and even more preferably 1:1.

If the concentration of the hydroxide salt (preferably ammonium hydroxide) solution is 14.5 Molar, then it is added to the compositions in the order of 1 to 80 milliliters/liter.

The selected acid for the compositions is phosphorous acid. It is preferred that the concentration of phosphorous acid in the compositions is of the order 40 to 800 grams/liter.

The preferred solvent phase for the compositions is distilled or deionised water.

For examples of other copper oxychloride-based compositions based on the protocols described above, see Table 2.

In some embodiments of the present invention, copper and copper-zinc compositions based on copper oxychloride and copper sulfate can be combined in ratios of 1:100 to 100:1. As copper oxychloride is usually significantly more expensive than copper sulfate and the protocol to produce the associated composition is more complex, such combinations may be useful not only for their utilitarian applications, but also for their cost effectiveness.

For examples of other phosphorous acid-solubilized Cu #, Cu—Zn # and Zn # compositions based on this protocol see Table 2. In the Table, gram or grams is abbreviated with the letter g, milliliter or milliliters is abbreviated with the letters ml.

TABLE 2

Examples of compositions and their components and their 50% inhibitory concentration ($IC_{50}$) on the growth of *Rhizoctonia solani* in culture.

| | Ingredients added per deciliter of distilled water | | | | $IC_{50}$ (% of stock |
| --- | --- | --- | --- | --- | --- |
| Composition | $CuSO_4 \cdot 5H_2O$ (CS), CuOCl-WP (WP), CuOCl-TP (TP) | $ZnSO_4 \cdot 7H_2O$ | $H_3PO_3$ | $NH_4OH$ 56.6% solution (optional) | solution) on growth of *R. solani*\*\*\* |
| Cu-31 | CS 10.0 g | — | 17.5 g | — | 0.15[&] |
| Cu-32-2X | WP 10.0 g | | 35.0 g | (8.0 ml) | — |
| Cu-32* | WP 5.0 g | — | 17.5 g | — | 0.19[&] |
| Cu-32-N* | WP 5.0 g | | 17.5 g | 2.0 ml | 0.17 |
| Cu-32-PO4 | WP 5.0 g | — | 20.6 ml $H_3PO_4$ (85% solution) | 2.0 ml | 0.15 |
| Cu-31:Cu-32 1:1 mixture[&] | | — | — | — | 0.17[&] |
| Cu-31:Cu-32 10:1 mixture | | | | | 0.16 |
| Cu-31:Cu-32 100:1 mixture | | | | | 0.15 |

TABLE 2-continued

Examples of compositions and their components and their 50% inhibitory concentration ($IC_{50}$) on the growth of *Rhizoctonia solani* in culture.

| | Ingredients added per deciliter of distilled water | | | | $IC_{50}$ (% of stock |
|---|---|---|---|---|---|
| Composition | $CuSO_4 \cdot 5H_2O$ (CS), CuOCl-WP (WP), CuOCl-TP (TP) | $ZnSO_4 \cdot 7H_2O$ | $H_3PO_3$ | $NH_4OH$ 56.6% solution (optional) | solution) on growth of *R. solani*\*\*\* |
| Cu-3l:CuZn-32-T mixture | | | | | 0.17 |
| Cu-31:CuZn-32-TA mixture | | | | | 0.15 |
| Zn-32 | — | 11.0 g | 17.5 g | (2.0 ml) | 0.19 |
| CnZn-32 | WP 5.0 g | 5.5 g | 17.5 g | (2.0 ml) | 0.17 |
| Cu-32-T | TP 4.4 g | — | 17.5 g | 2.0 ml | 0.16 |
| CuZn-32-T | TP 2.2 g | 2.8 g | 17.5 g | (2.0 ml) | 0.17 |
| CuZn-32-TA | TP 2.2 g | Zinc acetate dihydrate 3.6 g | 17.5 g | (2.0 ml) | 0.17 |
| CuZn-32-TN | TP 2.2 g | Zinc nitrate hexahydrate 2.8 g | 17.5 g | (2.0 ml) | 0.15 |
| Cu-36 | WP 5.0 g | — | 5.0 ml $H_2SO_4$ (18.7M) | 2.0 ml | 0.26 |
| CuZn-46-N | CS 2.5 g | 2.75 g | 17.5 g | 4.0 ml | 0.28 |
| CuZn-47-N | CS 10.0 g | 11.0 g | 80.0 g | 8.0 ml | 0.14 |

| Composition | $CuSO_4 \cdot 5H_2O$ | $ZnSO_4 \cdot 7H_2O$ | $H_3PO_3$ | $NH_4OH$ (19% or 56.6% solution) | |
|---|---|---|---|---|---|
| Cu#28\*\* | CS 16.0 g | — | 4.0 g | 4.0 ml (19%) | 0.18 |
| Cu#31 | CS 10.0 g | — | 17.5 g | 2.0 ml (56.6%) | 0.15 |
| CuZn#12 | CS 8.0 g | 8.8 g | 4.0 g | 4.0 ml (19%) | $0.14 \pm 0.02^S$ Mean ± S.D. n = 6 |
| Zn#4 | — | 17.6 g | 4.0 g | 4.0 ml (19%) | 0.17 |
| CuZn#31 | CS 5.0 g | 5.5 g | 17.5 g | 2.0 ml (56.6%) | 0.20 |
| CuOCl-WP | WP 5.0 g | — | — | — | 2.0 |
| CuOCl-TP | TP 4.4 g | — | — | — | 1.8 |
| $CuSO_4$ | CS 16.0 g | — | — | — | 0.39 |
| $ZnSO_4$ | — | 17.6 g | — | — | 0.33 |
| $H_3PO_3$ | — | — | 4.0 g | — | $0.64^+$ |

\*Compositions do not contain a basic ammonium salt (e.g. Cu-32) or the ammonium hydroxide was optionally added after the phosphorous acid to increase the pH of the composition (e.g. Cu-32-N).
\*\*Compositions designated with # are prepared as insoluble metal-ammonium complexes that are solubilized with phosphorous acid.
\*\*\*The concentration of compositions required to inhibit the growth of *R. solani* by 50% ($IC_{50}$) on potato dextrose agar after 24 hour culture at 22° C.
$^&$The 1:1 mixture contains a total of 2.5 g/dL of elemental copper, 1.25 g/dL from the $CuSO_4 \cdot 5H_2O$ and CuOCl-WP compositions and has the expected $IC_{50}$ against *R. solani* based on the results of Cu-31 and Cu-32, as do the 10:1 and 100:1 Cu-31:Cu-32 mixtures.
$^S$CuZn#12 was used as an internal standard in most experiments.
$^+$Equivalent to the concentration in Cu#28, Zn#4 and CuZn#12.

It is envisaged that for practical use in agriculture as a foliar spray, for example, the stock solution of a composition would be added to water with mixing or stirring to a dilution of, for example, 100- to 1,000-fold. An appropriate amount of a stock solution of sodium nitrite, e.g. 690 grams/liter (10 M) would then be added with continued stirring or mixing to a dilution of, for example, 200-fold to produce a final concentration of 50 mM in the combined product. An appropriate auxiliary, spreader-sticker, adjuvant, carrier, surfactant or extender may then be added at an appropriate concentration to the effective amount of the combined product.

In order that the present invention may be illustrated, more easily appreciated and readily carried into effect by those skilled in the art, embodiments thereof will now be presented by way of non-limiting examples only and described with reference to the accompanying drawings.

Example 1. Fungal Growth Inhibition Assay with Compositions

Inhibition of fungal growth assay. The *Rhizoctonia solani* (*R. solani*) strain was isolated from sclerotia on the skin of a potato and was maintained in culture on potato dextrose agar (PDA) at room temperature (22° C.). To assess the effects of the compositions on fungal growth, 10 microliters of the test compositions diluted in sterile distilled water was placed in the wells of a 12-well tissue culture plate and 1 milliliter of PDA was added by pipette to each well. The plate was agitated to distribute the test composition evenly throughout the agar (distilled water alone was used as control) and then the agar was allowed to set. Plugs of agar containing fungal hyphae (3×3 millimeters) from an established fungal culture were cut out using a scalpel and inserted into holes cut into the centre of the agar in each well of the 12-well plate, which was then cultured at room temperature. To assess the effects of compositions on radial fungal growth, the diameter of the fungal hyphae was measured twice at a 90° angle using a ruler and the average diameter in millimeters was calculated. Concentrations of compositions required to inhibit the radial growth of *R. solani* by 50% ($IC_{50}$) were determined graphically.

Results:

As shown in Table 2, the various Cu, CuZn, Cu # and Cu—Zn # compositions all have $IC_{50}$ values in the range 0.14% to 0.28% of stock solution (around 700- to 350-fold dilution of the stock solutions, respectively), showing that the method by which the compositions are made and the source of copper does not dramatically alter the ability of the compositions to inhibit the growth of the plant pathogenic fungus *R. solani* in culture. In addition, copper (and CuZn) compositions based on copper oxychloride and copper sulfate may be mixed together over a wide range of concentrations and still maintain full antifungal activity.

It is noteworthy that the compositions are more active than the components from which they are made. CuOCl-WP, CuOCl-TP, copper sulfate, zinc sulfate and phosphorous acid base $IC_{50}$ values of 2.0%, 1.8% 0.39%, 0.33% and 0.64% respectively against *R. solani* so the fact that all of the compositions have considerably lower $IC_{50}$ values (around 0.15%) than would be expected when combining a copper composition and phosphorous acid; this indicates synergy of the components when combined together in the compositions described. This synergy is particularly noticeable with the copper oxychloride-derived compositions since CuOCl-WP and -TP have particularly low $IC_{50}$ values of 2.0% and 1.8% respectively, and phosphorous acid has an $IC_{50}$ of 0.64% and yet Cu-32 and Cu-32-T have $IC_{50}$ values of 0.19% and 0.17% respectively. Taken together, these results showing a synergistic activity of the component parts when combined in the compositions reveals a surprisingly enhanced antimicrobial potency of these compositions made using the protocols described above in the "Best mode for carrying out the invention" section.

It is also noteworthy that there are particular advantages of the copper-zinc (CuZn) compositions: (i) Commercially available copper-based fungicides (e.g. Bordeaux mixture, copper oxychloride, copper hydroxide and copper oxide) typically contain around 2.5 grams/liter of elemental copper when diluted, for example, for foliar spraying. The copper salt in these products is largely insoluble and in suspension so the products stick onto leaves of plants; when it rains and the product on the leaves becomes wet, a small amount of active ionic copper is released and this has antimicrobial activity. A negative side-effect of rain is that it washes the copper suspension off the leaves onto the ground, so frequent application of these products is required.

Most of the copper-only compositions described in Table 2 contain 25 grams/liter of elemental copper (4.4, 5 and 10 grams/deciliter of CuOCl-TP, CuOCl-WP and copper sulfate, respectively) in the 100× stock solutions, so a 1:100 diluted foliar spray of composition would contain 0.25 grams/liter of elemental copper which is 10-times less than typical commercial products. The presence of ionic copper (and zinc) in the compositions (in addition to the synergistic antimicrobial effect with phosphorous acid) partly explains why they are so much more active (10- to 15-times) at inhibiting the growth of *R. solani* compared to the suspension products CuOCl-WP and -TP even in the PDA cultures in the presence of water (see Table 2). In addition, the suspensions of current copper-based products tend to settle and can block spraying equipment, whereas the compositions described, are ionic solutions that are more suitable for use with spraying equipment.

Crops such as grapevines and potatoes are typically sprayed 10 to 15 times in a season, whereas a Cu or CuZn composition described herein used as a spray treatment would contain roughly as much copper in a whole season's treatment as one application of a commercially available copper-based product. The CuZn compositions are typically made with only 50% of the amount of copper contained in comparable copper-only compositions (e.g. see Cu #28 and CuZn #12 in Table 2), and yet they are comparable in activity as antifungal compositions; this means that the copper concentration is reduced to $\frac{1}{20}^{th}$ that of commercial copper-based products. It is well-recognized that large amounts of commercial copper bused fungicides (insoluble, not ionic copper) must be applied frequently) to be effective and this leads to large amounts of potentially toxic copper being washed into the soil by rain or watering.

Cultivated agricultural land (where copper-based fungicides are not used) is often deficient in micronutrients such as copper and especially zinc (Sillinpaa, M. (1982) Micronutrients and the nutrient status of soils: A global study. FAO Soils Bulletin, No. 48, FAO, Rome, Italy), and so the CuZn compositions described herein could provide an effective nutritional amount of these micronutrients when applied to plants.

Example 2. Fungicidal Assays with Compositions and Sodium Nitrite

Fungicidal assay. Plugs of agar containing fungal hyphae (3×3 millimeters) were cut from a culture of *Magnaporthe oryzae* (*M. oryzae*) on potato dextrose agar (PDA) and placed in the wells of a 96-well plate containing 75 microliters of various concentrations of sodium nitrite or sterile distilled water (DW). To start the reaction, 75 microliters of compositions (diluted in DW) was added to the wells. The plate was carefully shaken and incubated at room temperature for 30 minutes when the liquid was removed and 150 microliters of CM-1 medium was added for 5 minutes to stop the reaction. The CM-1 medium was removed and the agar plugs were inserted into holes cut into PDA in 9 centimeter Petri dishes (6 to 7 agar plugs per Petri dish), which were then cultured at room temperature for 4 days when fungal growth was measured (twice at a 90° angle using a ruler) and the average diameter in millimeters was calculated. If no fungal growth could be detected by eye, the cultures were observed by phase microscopy (40×) to confirm that there was no growth (NG) as judged by visual examination.

Results:

The results in Table 3 show that, in the absence of sodium nitrite ($NaNO_2$), CuZn #12 and its components, copper sulfate-zinc sulfate (CuZn) and phosphorous acid ($H_3PO_3$) at the highest concentration tested (1% of stock solution) were not fungicidal to *M. oryzae*. However, in the presence of 10 millimolar sodium nitrite all three compositions showed a concentration-dependent increase in fungicidal activity with just 30 minutes exposure. It is clear that CuZn was slightly less fungicidal than phosphorous acid and that both were considerably less active than CuZn #12. The result with phosphorous add was surprising since the generation of nitrogen oxides from $NaNO_2$ is pH-dependent and phosphorous acid has a lower pH than CuZn #12 (Table 3). However, this unexpected result was explained when the synergy between CuZn and phosphorous acid was calculated.

In order to determine whether the combined activity of CuZn and phosphorous acid in the form of CuZn #12 in the presence or absence of sodium nitrite was synergistic, the following formula was used:

$$Sf=M/[A+0.01\times B(100-A)]$$

Where: Sf is the Synergy factor; A is the percent of control, of CuZn; B is the percent of control of phosphorous acid; M is percent of control of the mixture, CuZn #12. If Sf>1 there is synergy. (Reference: Samoucha Y and Cohen Y (1984). Synergy between Metalaxyl and Mancozeb in controlling downy mildew in cucumbers. Phytopathology 74:1434-1437).

When Synergy factor values were calculated (Table 3), clear synergy was observed at composition concentrations of 0.3% (Sf=1.37) and 3% (Sf=1.57) in combination with 10 mM sodium nitrite.

Therefore, these results show that the combination of CuZn and phosphorous acid in the form of composition CuZn #12 acts synergistically when combined with sodium nitrite to generate a surprisingly greater than expected antimicrobial/fungicidal effect.

TABLE 3

The fungicidal effects of composition CuZn#12 and its copper-zinc (CuZn) and phosphorous acid ($H_3PO_3$) components at equivalent concentrations on *M. oryzae* in the presence and absence of 10 millimolar sodium nitrite.

| $NaNO_2$ (mW) | Composition concentration | *M. oryzae* fungal growth (mm) with composition | | | Sf |
|---|---|---|---|---|---|
| | | CuZn | $H_3PO_3$ | CuZn#12 | |
| 0 | 1% | 20 | 21 | 20 | 1 |
| 10 | 0.1% | 20 | 20 | 20 | 1 |
| 10 | 0.3% | 17 (A = 15%) | 13 (B = 38%) | 7 (M = 65%) | 1.37 |
| 10 | 1% | 14 (A = 30%) | 11 (B = 48%) | NG (M = 100%) | 1.57 |
| pH of a 1% solution in DW | | 4.91 | 2.12 | 2.48 | |

NG indicates no growth.
Control fungal growth with distilled water (DW) was 20 mm.
The percent of control values in parentheses were used to calculate the Synergy factor (Sf: a value >1.0 indicates synergy) as described in the text.

Example 3. Sporicidal Assays with Compositions and Sodium Nitrite

Sporicidal assays: (1) Spores of *Botrytis cinerea* (*B. cinerea*; also known, as gray mold) and *Fusarium oxysporum* f. sp. *cubense* (*F. oxysporum*; causes Panama disease of banana) were isolated from mature cultures growing on potato dextrose agar (PDA) in 9 centimeter Petri dishes by gentle washing with sterile distilled water (DW). The spore-containing solution was passed through a 40 micron filter to remove debris and the filtrate was adjusted to $2 \times 10^6$ (*B. cinerea*) or $5 \times 10^6$ (*F. oxysporum*) spores/milliliter in DW. Ten microliter samples of sodium nitrite (dissolved in sterile DW) or DW were added to the wells of a 48-well tissue culture plate containing 10 microliters of the spore solutions. To start the reaction, the compositions were added (time=0) and the reactants were thoroughly mixed by carefully shaking the plate. After 30 minutes incubation at room temperature the reaction was stopped by adding 1 milliliter of PDA at 60° C. The plates were then cultured at room temperature for 3 to 4 days when fungal growth was assessed visually. Fungal growth was scored as follows: Fungal growth equivalent to control cultures (with DW) were scored as 2. If fungal growth was clearly less than the control it was scored as 1. No fungal growth was scored as 0. When PDA was added immediately after the composition (within 2 seconds) no fungal growth was observed regardless of the concentrations of sodium nitrite (up to 100 millimolar) or the composition (up to 1% dilution of stock solution) used, showing that PDA effectively inhibited the reaction even at the highest concentrations of $NaNO_2$ (100 mM) and CuZn #12 (1%) used in the experiments.

(2) To assess the sporicidal effect of compositions alone, *B. cinerea* spores ($1 \times 10^4$) were exposed to various concentrations of the compositions or DW for at 22° C. in microfuge tubes. After 1 hr exposure, the spores were washed twice with 1 ml of DW and then suspended in PDA and incubated for 6 days when fungal growth was assessed as described in Table 4.

Results:

The results in Table 4 show that compositions CnZn #12, Cu #28, Zn #4 were slightly sporicidal at 10% of stock solution but not at lower concentrations, whilst composition Cu-32 showed slight sporicidal activity at 10% and 5% of stock solution, but not at lower concentrations. The greater sporicidal activity of Cu #32 can be explained by its higher concentration of phosphorous acid (17.5 grams/deciliter) compared to the other 3 compositions (4 grams/deciliter; see Table 2).

TABLE 4

The sporicidal effect of compositions against spores of *B. cinerea* after 1 hour incubation at 22° C. in the absence of sodium nitrite.

| % of stock solution | Fungal growth 2* = Control growth; 1 = Reduced growth; 0 = No growth | | | |
|---|---|---|---|---|
| | Cu#28 | Zn#4 | CuZn#12 | Cu-32 |
| 10 | 1 | 1 | 1 | 0 |
| 5 | 2 | 2 | 2 | 1 |
| 2 | 2 | 2 | 2 | 2 |
| 1 | 2 | 2 | 2 | 2 |

Spores exposed to distilled water for 1 hr were controls*.
Fungal growth was assessed after 6 days of the treated spores being suspended in potato dextrose agar.

2. The sporicidal effects of the 4 compositions tested in the experiment shown in Table 4, were relatively weak considering the high concentrations used (the compositions are designed to be used at ≤1% of stock solution). However, because the compositions are acidic owing to the presence of phosphorous acid, it was expected that they might show increased sporicidal activity when combined with sodium nitrite since the ensuing reaction would generate nitrous acid which liberates highly reactive nitrogen oxides that are known to be sporicidal.

The results in Table 5 show that sodium nitrite alone ($NaNO_2$+DW) and all of the compositions alone ($NaNO_2$=0) had no sporicidal activity against spores of *B. cinema* at any concentration tested (all scored 2=control growth). Copper sulfate (Cu), zinc sulfate (Zn), copper sulfate with zinc sulfate (CuZn) only showed sporicidal activity in the presence of 100 mM sodium nitrite, while phosphorous acid was active at 1% (equivalent to its concentration in the 3 compositions at 1%), but showed little activity at lower concentrations. All 3 compositions showed a concentration dependent increase in sporicidal activity with sodium nitrite. The most active composition was Cu #28, followed by CuZn #12 and Zn #4. The sporicidal activity of CuZn #12 was greater than expected from its components Cu—Zn and phosphorous acid (as discussed in the fungicidal experiment—see Table 3), despite the latter having a lower pH than CuZn #12 both in the presence and absence of 100 millimolar sodium nitrite. Since Cu #28 was considerably more sporicidal than CuZn #12 and Zn #4 despite the pH values of the 3 compositions being similar, it appears that the presence of copper in the compositions Cu #28 and CuZn #12 (the latter is less active than Cu #28 presumably owing to the presence of only half the concentration of copper ions—see Table 2) in conjunction with phosphorous acid leads to a surprising enhancement of sporicidal activity in the presence of sodium nitrite that is unrelated to simple pH issues.

Time-course experiments revealed (i) that effective sporicidal activity was generated within 1 minute of mixing 100 millimolar sodium nitrite and CuZn #12 (1% of stock solution), and (ii) that sporicidal activity was spent around 6 hours after mixing the reactants (data not shown).

Experiments with various compositions and sodium nitrate or urea showed no signs of sporicidal activity to spores of *B. cinerea* (data not shown), so the preferred compound for generating sporicidal activity when combined with the compositions is sodium nitrite.

TABLE 5

The sporicidal activity of three compositions and their components: copper sulfate (Cu), zinc sulfate (Zn), copper sulfate and zinc sulfate (CuZn) and phosphorous acid ($H_3PO_3$), with and without sodium nitrite ($NaNO_2$), against spores of *B. cinerea*. The pH values of selected 1% solutions with and without 100 millimolar sodium nitrite are also shown.

| | | | | | Fungal growth: 2 = Control growth*; 1 = Reduced growth; 0 = No growth | | | | | | | | | | | |
|---|---|---|---|---|---|---|---|---|---|---|---|---|---|---|---|---|
| $NaNO_2$ | | Cu | Zn | CZ | $H_3PO_3$ (%) | | | Zn#4 (%) | | | Cu#28 (%) | | | CuZn#12 (%) | | |
| mM | DW | 1% | 1% | 1% | 0.1 | 0.3 | 1 | 0.1 | 0.3 | 1 | 0.1 | 0.3 | 1 | 0.1 | 0.3 | 1 |
| 0 | 2* | 2 | 2 | 2 | 2 | 2 | 2 | 2 | 2 | 2 | 2 | 2 | 2 | 2 | 2 | 2 |
| 1 | 2 | 2 | 2 | 2 | 2 | 2 | 2 | 2 | 2 | 2 | 2 | 2 | 1 | 2 | 2 | 2 |
| 3 | 2 | 2 | 2 | 2 | 2 | 2 | 1 | 2 | 2 | 2 | 2 | 0 | 0 | 2 | 2 | 1 |
| 10 | 2 | 2 | 2 | 2 | 2 | 2 | 0 | 2 | 2 | 1 | 2 | 0 | 0 | 2 | 1 | 0 |
| 30 | 2 | 2 | 2 | 2 | 2 | 2 | 0 | 2 | 2 | 0 | 1 | 0 | 0 | 2 | 0 | 0 |
| 100 | 2 | 0 | 1 | 1 | 2 | 1 | 0 | 2 | 1 | 0 | 0 | 0 | 0 | 2 | 0 | 0 |
| pH: 1% in DW | | | | 4.91 | | 2.12 | | | 2.65 | | | 2.51 | | | 2.48 | |
| pH: 1% in DW + 100 mM $NaNO_2$ | | | | 5.95 | | 4.22 | | | 4.70 | | | 4.38 | | | 4.57 | |

The results in Table 6 show that copper sulfate and copper oxychloride-WP had no sporicidal activity when combined with sodium nitrite at concentrations up to 30 millimolar (100 millimolar sodium nitrite alone was sporicidal to *F. oxysporum* spores, data not shown). The 2 compositions tested, Cu-31 and Cu-32 contain copper sulfate and CuOCl-WP respectively as their copper salt with 17.5 grams/deciliter of phosphorous acid (Table 2), and both compositions demonstrated synergistic sporicidal activity when combined with sodium nitrite, when compared to their components alone when combined with sodium nitrite at equivalent concentrations.

These results confirm and extend those in Table 5, by showing that 2 different copper salts even in simple compositions with phosphorous acid demonstrate synergistically enhanced sporicidal activity compared to their components alone when combined with sodium nitrite.

TABLE 6

The sporicidal activity of two compositions and their components against spores of *F. oxysporum*: copper sulfate (CS; in Cu-31), copper oxychloride-WP (CuOCl; in Cu-32) and phosphorous acid ($H_3PO_3$), with and without sodium nitrite ($NaNO_2$) against spores of *B. cinerea*.

| | | | | Fungal growth: 2* = Control growth; 1 = Reduced growth; 0 = No growth | | | | | | | | |
|---|---|---|---|---|---|---|---|---|---|---|---|---|
| $NaNO_2$ | | CS | CuOCl | $H_3PO_3$ (%) | | | Cu-31 (%) | | | Cu-32 (%) | | |
| mM | DW | 1% | 1% | 0.03 | 0.1 | 0.3 | 0.03 | 0.1 | 0.3 | 0.03 | 0.1 | 0.3 |
| 0 | 2* | 2 | 2 | — | — | 2 | — | — | 2 | — | — | 2 |
| 1 | 2 | 2 | 2 | 2 | 2 | 2 | 2 | 2 | 2 | 2 | 2 | 2 |
| 3 | 2 | 2 | 2 | 2 | 2 | 1 | 2 | 1 | 0 | 2 | 1 | 0 |
| 10 | 2 | 2 | 2 | 2 | 2 | 0 | 2 | 0 | 0 | 2 | 0 | 0 |
| 30 | 2 | 2 | 2 | 2 | 1 | 0 | 2 | 0 | 0 | 1 | 0 | 0 |

Taken together, these results have important implications for potential use of these sporicidal compositions in the field. It is well known that acidified sodium nitrite generates nitrous acid which in turn decomposes into sporicidal nitrogen oxides. However, the results presented here show that copper-based (and copper-zinc-based compositions containing phosphorous acid surprisingly have greater sporicidal activity than equivalent concentrations of phosphorous acid alone when combined with sodium nitrite.

Furthermore, using the present compositions with sodium nitrite as, for example, a foliar spray, would not only exert a sporicidal effect that could kill spores before their release into the air and thereby reduce the spread of the associated fungal infection, but once the sporicidal reaction was spent (after around 6 hours), there would be a continuing, persistent antimicrobial and plant defense-stimulating activity afforded by the copper or copper-zinc and phosphorous acid-based composition remaining on the treated plants.

When a foliar spray mixture containing 1% of composition CuZn #12 and 50 millimolar sodium nitrite was sprayed twice daily for 5 days onto 10-day old rice seedlings there was no significant effect on the growth of the seedlings and no chlorosis was observed compared to control rice seedlings sprayed with water alone. Interestingly, when the same foliar spray was used on rose plants whose rosebuds were infested with aphids (greenfly and blackfly) the insects were found to be dead within 5 minutes of being sprayed; observation of the sprayed rose plants over the next few days showed that neither the plants nor the rosebuds were damaged by the spray.

Taken together these results show that the composition combined with sodium nitrite was not phytotoxic to rice seedlings or rose plants, whilst the spray was an effective insecticide against aphids. As such, various embodiments of the present invention include the compositions described herein used as an insecticide.

Example 4. Scleroticidal Assays with Compositions and Sodium Nitrite

Scleroticidal assay. Plugs of agar containing white immature sclerotia (3×3 millimeters) were cut from a 6 to 8 day culture of *R. solani*, whilst mature melanized (black) sclerotia (around 10×3 millimeters) were excised from 13-day old *R. solani* cultures and cut into 2×3 millimeter pieces with a scalpel. The sclerotia samples were then placed in the wells of a 96-well plate containing 75 microliters of various concentrations of sodium nitrite or sterile distilled water (DW) as control. TO start the reaction, 75 microliters of CuZn #31 (diluted in DW) was added to the wells. The plate was carefully shaken and incubated at room temperature for 10 minutes when the liquid was carefully removed and 150 microliters of CM-1 medium was added for 5 minutes to stop the reaction. The CM-1 medium was removed and the agar plugs carefully inserted into holes cut into PDA in 9 cm Petri dishes (4 plugs per Petri dish) which were then cultured at room temperature until fungal growth was measured twice at a 90° angle using a ruler and the average diameter in millimeters was calculated. If no fungal growth could be detected by eye, the cultures were observed by phase microscopy (40×) to confirm that there was no growth (NG) as judged by visual examination.

Results:

The results in FIG. 2 show that the combination of CuZn #31 (1%) and sodium nitrite (1 to 100 millimolar) was concentration-dependently scleroticidal to both immature (white) and mature (black, pigmented) sclerotia of *R. solani* with just 10 minutes exposure. The white sclerotia were more sensitive to the combination of reagents than black sclerotia. CuZn #31 (1%+0) and sodium nitrite (0+100) alone had little or no significant scleroticidal effect on either white or black sclerotia since fungal growth was similar to that seen in controls (0), showing that the generation of nitrogen oxides was essential for the observed scleroticidal activity.

It is noteworthy that naturally occurring microsclerotia of *Verticillium dahliae* (*V. dahliae*) in potato fields are mostly (~90%) less than 125 micrometers in diameter (Smith V L and Rowe R C. Phytopathology 74: 553-556, 1984), and it is likely that microsclerotia would be more susceptible to the scleroticidal effect of CuZn #31 combined with sodium nitrite than the 2×3 millimeter pieces of mature sclerotia used here.

The results in Table 7 show the scleroticidal activity of four similar compositions (the components of which are shown in Table 7) against melanized (black) sclerotia of *R. solani* in the presence and absence of increasing concentrations of sodium nitrite. None of the compositions was scleroticidal without sodium nitrite (0+1%) and equally the highest concentration of sodium nitrite tested (30+0) was not scleroticidal. However, all four compositions showed a dose-dependent increase in scleroticidal activity with increasing concentrations of sodium nitrite indicating that the generation of nitrogen oxides was essential for the observed scleroticidal activity. Overall, the four compositions had a similar scleroticidal activity (measured by the ability of the sclerotia to produce hyphae when cultured on PDA after treatment), with the two compositions containing copper sulfate being slightly more active than those containing copper oxychloride. All four compositions were completely scleroticidal with 30 millimolar sodium nitrite, as was seen with composition CuZn #31. (FIG. 2).

TABLE 7

The scleroticidal activity of four compositions, with and without sodium nitrite ($NaNO_2$), against black (melanized) sclerotia of *R. solani*. Treated sclerotia were cultured on PDA for 2 days when radial hyphal growth (in millimeters) was measured. The components of the compositions are shown at the bottom of the Table.

| $NaNO_2$ (mM) + 1% of composition | Mean fungal growth (in mm ± SD, n = 2) of black sclerotia after treatment: Cu-31 | Cu#31 | Cu-32 | Cu-32-N |
|---|---|---|---|---|
| Control | 39 ± 4 | | 42 ± 3 | |
| 0 + 1% | 39 ± 2 | | 40 ± 2 | |
| 30 + 0 | 41 ± 2 | | 43 ± 2 | |
| 1 + 1% | 38 ± 2 | 37 ± 2 | 37 ± 4 | 39 ± 4 |
| 3 + 1% | 22 ± 3 | 26 ± 2 | 29 ± 3 | 33 ± 3 |
| 10 + 1% | 13 ± 2 | 16 ± 2 | 19 ± 3 | 22 ± 0 |
| 30 + 1% | NG | NG | NG | NG |
| | Amount of compound in composition (g/dL or *ml/dL) | | | |
| $CuSO_4$•$5H_2O$** | 10 | 10 | — | — |
| CuOCl-WP** | — | — | 5 | 5 |
| $NH_4OH$ (30%)* | — | 2 | — | 2 |
| Phosphorous acid | 17.5 | 17.5 | 17.5 | 17.5 |

**Both compounds provide 2.5 g/dL of elemental copper at the indicated concentrations.

Example 5. Inhibition of Fungal Sclerotia Formation

Inhibition of fungal growth and inhibition of sclerotia formation assay: The *Rhizoctonia solani* (*R. solani*) strain used in these experiments was isolated from sclerotia on a potato and maintained in culture on potato dextrose agar (PDA) at room temperature (22° C.). To assess the effects of composition on fungal growth, 10 microliters of the test compositions diluted in sterile distilled water were placed in the wells of a 12-well tissue culture plate and 1 milliliter of PDA was added by pipette to each well. The plate was agitated to distribute the test composition evenly throughout the agar (distilled water alone was used as control) and then the agar was allowed to set. Plugs of agar containing fungal hyphae (3×3 millimeters) from an established fungal culture were cut out using a scalpel and inserted into holes cut into the centre of the agar in each well of the 12-well plate, which was then cultured at room temperature (22° C.). To assess the effects of compositions on radial fungal growth, the diameter the fungal hyphae was measured twice at a 90° angle using a ruler and the average diameter in millimeters was calculated. If no fungal growth could be detected by eye, the cultures were observed by phase microscopy (40×) to confirm that there was no growth (NG) as judged by visual examination.

To assess the effects of compounds and compositions on sclerotia formation, the *R. solani* cultures were examined daily and radial fungal growth was measured until the cultures were confluent after which time the development of white (immature) sclerotia and mature (black pigmented) sclerotia was noted and the number of mature sclerotia was counted on day 10 of culture.

Results:

The results in Table 8 show that composition Cu-32 (containing phosphorous acid), completely inhibited the formation of immature and mature sclerotia in cultures of *R. solani*. Although Cu-32 partially inhibited the radial growth of *R. solani* on day 1 (and day 2) of culture, growth was confluent by day 3 of culture, but sclerotia formation was completely absent at all three concentrations. Composition Cu-32-PO4 (containing phosphoric acid) also partially inhibited the growth of *R. solani* but once confluence was reached white sclerotia and then black sclerotia formed at the two lower concentrations tested, as was seen in the control cultures (with distilled water). At the highest concentration tested, Cu-32-PO4 was similar to Cu-32 at inhibiting growth and preventing white and black sclerotia formation. Composition Cu-36 (containing sulfuric acid) was the least potent inhibitor of the growth of *R. solani*, and sclerotia formation was very similar in time course and numbers to the control cultures at all 3 concentrations tested.

These results clearly show that Cu-32 was the most potent inhibitor of sclerotia formation, with Cu-32-PO4 having the same effect at the highest concentration tested and Cu-36 having little effect on sclerotia formation. Since the three compositions are identical apart from the acid used and have similar pH values (Table 8 legend), the results surprisingly show that the presence of phosphorous acid in the compositions is required for optimal inhibition of sclerotia formation by *R. solani*.

TABLE 8

The effects of three compositions, varying only in the acid they contain, on radial growth and sclerotia formation by *Rhizoctonia solani*.

|  | Control | Cu-32 (%)* | | | Cu-32-PO4 (%)* | | | Cu-36 (%)* | | |
| --- | --- | --- | --- | --- | --- | --- | --- | --- | --- | --- |
|  | (n = 3) | 0.05 | 0.1 | 0.2 | 0.05 | 0.1 | 0.2 | 0.05 | 0.1 | 0.2 |
| Day 1 growth in mm | 19, 19, 19 | 16 | 13.5 | 9 | 18 | 14 | 11 | 19 | 19 | 14 |
| Day growth confluent | 2, 2, 2 | 3 | 3 | 3 | 2 | 3 | 3 | 2 | 2 | 3 |
| Day white SCL 1st seen** | 3, 3, 4 | — | — | — | 4 | 4 | — | 4 | 4 | 5 |
| Day black SCL 1st seen** | 5, 5, 5 | — | — | — | 5 | 5 | — | 5 | 5 | 6 |
| No. black SCL on day 10 | 38, 48, 31 | 0 | 0 | 0 | 40 | 34 | 0 | 39 | 32 | 28 |

Composition pH (diluted 1:1000 in distilled water, equivalent to 0.1% vol/vol of stock solution): Cu-32 = 2.69; Cu-32-PO4 = 2.63; Cu-36 = 2.46.
*The compositions were identical except for the acid used - see Table 1; (%) = percent of stock solution.
**White/black SCL = immature/mature (pigmented) sclerotia.

The results in Table 9 show that phosphorous acid and its alkali metal salt, potassium phosphite, both completely inhibited the formation of mature (black, pigmented) sclerotia by *R. solani* at concentrations of 40 milligrams/liter and higher. At these concentrations both products are only modest inhibitors of fungal growth, so the inhibitory effect of phosphite on sclerotia formation occurs despite fungal growth.

Commercial potassium phosphite products are typically used at concentrations around 4 grams/liter as foliar sprays to stimulate plant defenses against pathogen attack; this concentration is 100-times higher than the concentration required to completely prevent sclerotia formation (40 milligrams/liter) by *R. solani* in culture.

TABLE 9

The effects of phosphorous acid and potassium phosphite on radial growth and sclerotia formation by *R. solani*.

|  | Control | Phosphorous acid (mg/L) | | | | | Potassium phosphite (mg/L) | | | | |
| --- | --- | --- | --- | --- | --- | --- | --- | --- | --- | --- | --- |
|  | (n = 2) | 10 | 20 | 40 | 80 | 160 | 10 | 20 | 40 | 80 | 160 |
| Day 1 growth in mm | 19, 19 | 18 | 18 | 16 | 14 | 11 | 19 | 19 | 19 | 18 | 15 |
| Day growth confluent | 2, 2 | 2 | 2 | 2 | 3 | 3 | 2 | 2 | 2 | 2 | 3 |

TABLE 9-continued

The effects of phosphorous acid and potassium phosphite
on radial growth and sclerotia formation by *R. solani*.

| | Control | Phosphorous acid (mg/L) | | | | | Potassium phosphite (mg/L) | | | | |
|---|---|---|---|---|---|---|---|---|---|---|---|
| | (n = 2) | 10 | 20 | 40 | 80 | 160 | 10 | 20 | 40 | 80 | 160 |
| Day white SCL 1$^{st}$ seen* | 3, 3 | 3 | 4 | — | — | — | 3 | 4 | — | — | — |
| Day black SCL 1$^{st}$ seen* | 5, 5 | 5 | — | — | — | — | 5 | 7 | — | — | — |
| No. black SCL on day 10 | 34, 27 | 17 | 0 | 0 | 0 | 0 | 9 | 2 | 0 | 0 | 0 |

*White/black SCL = immature/mature (pigmented) sclerotia.

The results in Table 10 show that Hortiphyte and Aliette, commercial products that contain potassium phosphite and Fosetyl-aluminum (phosphonate) respectively, have almost identical effects on the growth and sclerotia formation by *R. solani* when adjusted to equivalent concentrations of phosphite as phosphorous acid.

Hortiphyte is sold as a liquid fertilizer that provides a source of nitrogen and potassium as well as phosphorus in the form of potassium phosphite. Aliette is sold as a fungicide and it contains the $PO_3^{3-}$ group in the form of aluminum tris O-ethyl phosphonate.

These results show that it is the concentration of phosphite/phosphonate group ($PO_3^{3-}$), and not the form in which it is present, that is important for it to inhibit sclerotia formation by *R. solani* in culture.

Phosphorous acid and phosphite salts are typically used at a concentration of 4 g/l as a foliar spray, but as shown in Tables 9 and 11, both products completely inhibit sclerotia formation at $1/100^{th}$ of this concentration (40 milligrams/liter). The glyphosate product tested in these experiments is recommended for use as a foliar spray at 8 grams/liter (containing 6.8 grams/liter of active ingredient), but sclerotia formation occurs (albeit at a reduced level compared to controls) at just $1/3^{rd}$ to $1/10^{th}$ of this concentration.

However, although glyphosate (herbicide) and phosphite (fungicide/plant defense inducer) have quite different uses in agriculture, it is potentially important in practical terms that either product used alone can significantly inhibit sclerotia formation at concentrations 10- to 100-times lower respec-

TABLE 10

The effects of 3 different forms of phosphate ($PO_3^{3-}$) on the radial
growth and sclerotia formation by *Rhizoctonia solani* in culture.

| | Control | Phosphorous acid (mg/L)* | | | | Hortiphyte (mg/L)* | | | | Aliette (mg/L)* | | | |
|---|---|---|---|---|---|---|---|---|---|---|---|---|---|
| | (n = 2) | 12 | 40 | 120 | 400 | 12 | 40 | 120 | 400 | 12 | 40 | 120 | 400 |
| Day 1 growth in mm | 19, 19 | 18 | 16 | 10 | 5 | 19 | 17 | 16 | 13 | 15 | 11 | 9 | 7 |
| Day growth confluent | 2, 2 | 2 | 2 | 4 | — | 2 | 2 | 2 | 3 | 2 | 2 | 3 | 4 |
| Day white SCL 1$^{st}$ seen** | 3, 3 | 3 | — | — | — | 3 | — | — | — | 3 | 8 | — | — |
| Day black SCL 1$^{st}$ seen** | 6, 6 | 6 | — | — | — | 6 | — | — | — | 6 | — | — | — |
| No. black SCL on day 10 | >20, >20 | >20 | 0 | 0 | 0 | >20 | 0 | 0 | 0 | >20 | 0 | 0 | 0 |

*All compositions were adjusted to have equal amounts of the phosphate/phosphonate group ($PO_3^3$). Hortiphyte contains potassium phosphite (25%), Aliette is aluminum tris O-ethyl phosphonate or Fosetyl-aluminum (80% by weight).
**White/black SCL = immature/mature (pigmented) sclerotia.

The results in Table 11 show that phosphorous acid is a more potent inhibitor of fungal growth (on day 1 of culture) and sclerotia formation (on day 10 of culture) than glyphosate or aminomethyl phosphonic acid (AMPA), which a soil microbial breakdown product of glyphosate. Owing to solubility issues, AMPA could only be tested at a highest concentration of 1 gram/liter where it was similar in activity on *R. solani* growth and sclerotia formation to glyphosate, but was considerably less active than phosphorous acid.

Figure 1:
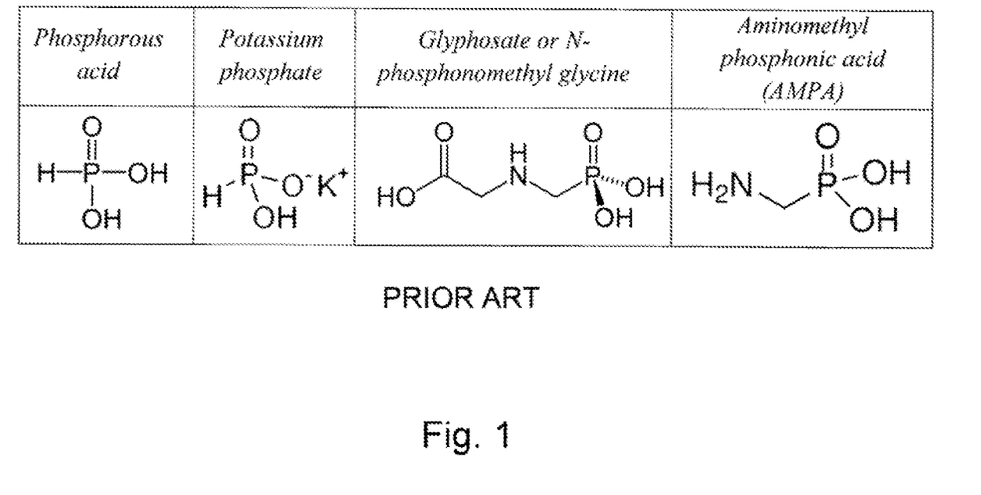
FIG. 1 depicts the structures of selected phosphite and phosphorate ($PO_3^{3-}$) chemicals.
Figure 2:
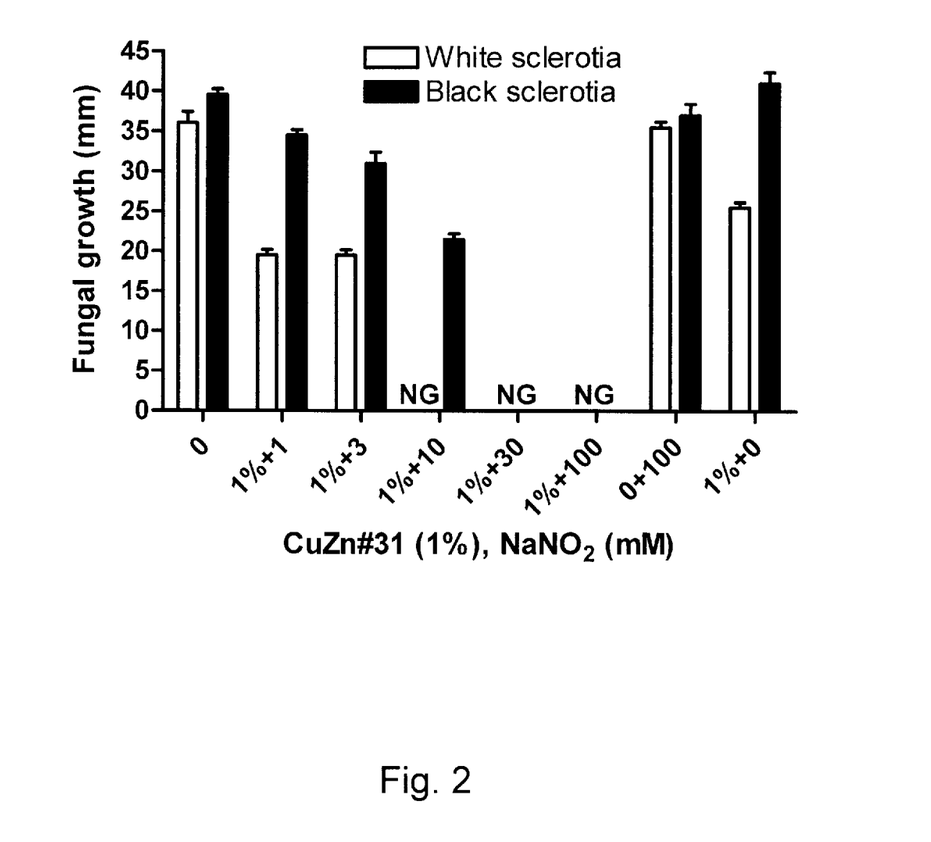
FIG. 2 is a graph depicting the scleroticidal effects of composition Cu—Zn #31 alone and in combination with sodium nitrite ($NaNO_2$).
Figure 3:
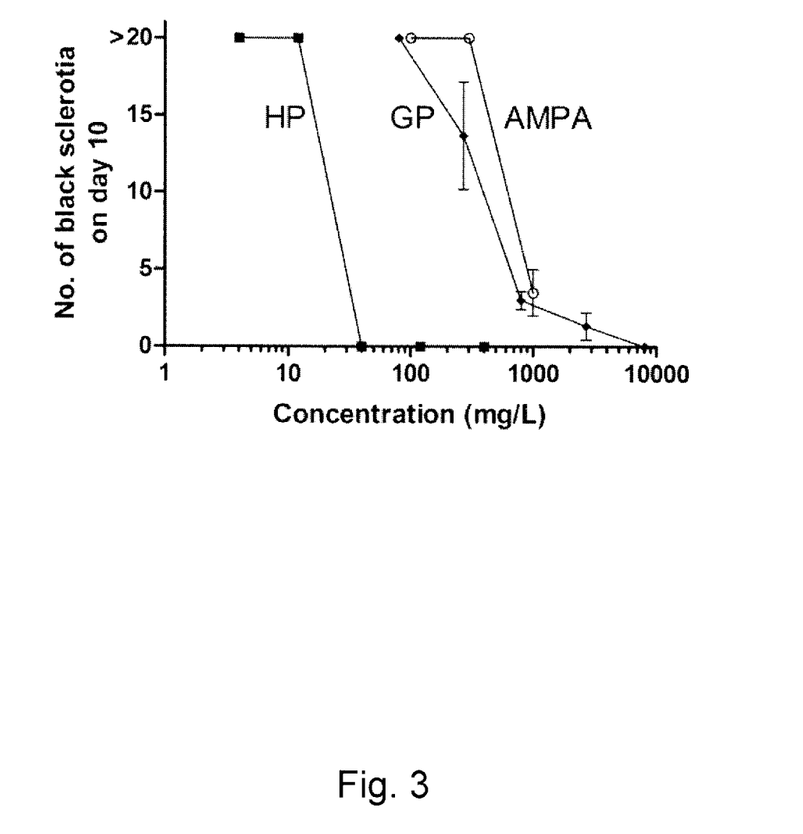
FIG. 3 is a graph depicting the effect of phosphorous acid (HP), glyphosate (GP) and aminomethyl phosphonic acid (AMPA) on black sclerotia formation by *Rhizoctonia solani*.

FIG. 3 shows the number of black sclerotia formed with phosphorous acid, glyphosate and AMPA from 2 to 3 replicate experiments. It is evident that phosphorous acid is around 20-times more active than glyphosate and around 30-times more active than AMPA at inhibiting black sclerotia formation by *R. solani*.

tively, than those used as foliar sprays for the product's primary agricultural application.

In other experiments, where phosphorous acid and glyphosate were combined, there was no evidence for synergistic or inhibitory effects of either compound on the other (data not shown); the effects of the combination were additive and dominated by phosphorous acid as might be expected from the results shown in Table 11 and FIG. 3. Since glyphosate and phosphorous acid and its potassium salt were found to be compatible in solution, a combination of, for example, glyphosate and potassium phosphite could also be used as an effective herbicide/inhibitor of sclerotia formation product in the field, especially since both products are highly effective when applied on plants as a foliar spray.

TABLE 11

The effects of phosphorous acid, glyphosate and aminomethyl phosphonic acid (AMPA) on the radial growth and sclerotia formation by Rhizoctonia solani in culture.

| | Control | Phosphorous acid (mg/L)* | | | | Glyphosate (g/L)* | | | | AMPA (g/L)$^S$ | | |
|---|---|---|---|---|---|---|---|---|---|---|---|---|
| | (n = 2) | 12 | 40 | 120 | 400 | 0.27 | 0.8 | 2.7 | 8 | 0.1 | 0.3 | 1 |
| Day 1 growth in mm | 20, 20 | 20 | 19 | 14 | 6 | 20 | 14 | 8 | 6 | 20 | 19 | 17 |
| Day growth confluent | 2, 2 | 2 | 2 | 3 | — | 2 | 2 | 6 | — | 2 | 2 | 2 |
| Day white SCL 1$^{st}$ seen** | 3, 3 | 3 | — | — | — | 3 | 3 | 6 | — | 3 | 3 | 5 |
| Day black SCL 1$^{st}$ seen** | 5, 5 | 6 | — | — | — | 5 | 6 | 8 | — | 5 | 8 | 9 |
| No. black SCL on day 10 | >20, >20 | >20 | 0 | 0 | 0 | >20 | 8 | 4 | 0 | >20 | >20 | 5 |

*Glyphosate is recommended for use as a foliar spray at 8 g/L, which represents 6.8 g/L of active ingredient.
$^S$AMPA is aminomethyl phosphonic acid.
**White/black SCL = immature/mature (pigmented) sclerotia.

It is well-known that acidification of sodium nitrite leads to the generation of reactive, biocidal nitrogen oxides, but the results presented herein clearly demonstrate that the novel copper- and copper-zinc-based ionic compositions with phosphorous acid surprisingly have synergistically greater antimicrobial (Table 3), sporicidal (Table 6) and scleroticidal (Table 7) activity than equivalent concentrations of phosphorous acid alone when combined with sodium nitrite, even though solutions of copper salts or copper and zinc salts alone combined with sodium nitrite are only weakly antimicrobial (Table 3) or sporicidal (Table 5). The various copper- and copper-zinc-based ionic compositions described are effective antimicrobial products as shown by their ability to inhibit the growth of the fungus R. solani with $IC_{50}$ values in the range 0.14% to 0.28% of stock solutions (Table 2), indicating that the method by which the compositions are made does not greatly affect their potent antimicrobial activity of the compositions. In addition, copper (and copper-zinc) compositions based on copper oxychloride and copper sulfate may be made or mixed together over a wide range of concentrations whilst maintaining foil antimicrobial activity. Unexpectedly, the compositions containing copper ions or copper and zinc ions together with, phosphorous acid are more antimicrobial than the components from which they are made (see Table 2). Taken together, these results demonstrate a synergistic activity of the compositions compared to their components and indicates a surprisingly enhanced antimicrobial potency of the compositions formulated as described in the "Best mode for carrying out the invention" section.

Importantly, when the compositions are combined with sodium nitrite both their antimicrobial and sporicidal activities are synergistically enhanced (Table 3 and Table 5, respectively). Such a combination used as, for example, a foliar spray, would not only exert a sporicidal effect that could kill fungal spores before their release in to the air and thereby reduce the spread of the associated fungal infection, but once the sporicidal reaction was spent (after around 6 hours), there would be a continuing, persistent antimicrobial and plant defense-stimulating activity afforded by the copper or copper-zinc and phosphorous acid components of the composition remaining on the treated plants. It should also be possible to extend the sporicidal reaction of the combination by including a slow-release form of sodium nitrite. This would be beneficial if the time needed to make and apply the sporicidal combination is greater than 6 hours.

Furthermore, the combination of compositions with sodium nitrite (neither of which are scleroticidal alone) also surprisingly exhibits synergistic scleroticidal activity (Table 7). Indeed, complete scleroticidal activity was achieved with a combination of the compositions diluted 1:100 (1%) of their stock solutions and 30 millimolar sodium nitrite with just 10 minutes exposure. These results suggest that such combinations might be effectively used in the field not only to prevent sclerotia formation by inhibiting fungal growth in the first place, but also by killing sclerotia in dead plant material before tillage, which otherwise would result in detrimental, long-term contamination of the soil with sclerotia.

Sclerotia-forming fungi such as R. solani, V. Dahliae and M. Phaseolina are a major problem in the soil of fields used for the production of lettuces, potatoes, spinach and strawberries. Killing sclerotia in the soil by fumigation is now banned or being phased out but there are no effective alternative strategies currently available. The combination of compositions with sodium nitrite are scleroticidal and strongly inhibit fungal growth so that sclerotia cannot be formed in the first place; in addition, the phosphorous acid in the compositions was shown to inhibit the formation of sclerotia at concentrations (≥40 milligrams/liter) that are considerably lower than those present in fungicidal concentrations of the compositions (at 1% of stock solution, the concentration of phosphorous acid is typically in the range of 400 to 1,750 milligrams/liter—see Table 2).

In addition to phosphorous acid, it was also demonstrated that potassium phosphite, glyphosate and Aliette, which are widely used agrochemicals that contain the phosphite or phosphonate ($PO_3^{3-}$) group, are all inhibitors of sclerotia formation. However, phosphorous acid, potassium phosphite and Aliette were the most potent inhibitors of sclerotia formation and since these are inexpensive and widely used products, it could reasonably be expected that daily application of these products to crops at low concentrations in the water supply such as sprays, drip lines or pivots could provide a convenient and cost-effective method to prevent the formation of sclerotia by fungi in the field.

A scleroticidal composition comprising a phosphite or phosphonate ($PO_3^{3-}$) containing compound has been surprisingly shown to prevent the formation of sclerotia by fungi. The compound may be, for example, phosphorous acid or a salt thereof for example, potassium, sodium, calcium, copper, aluminum, zinc, or ammonium phosphites or combinations thereof. The compound may also be, in some embodiments of the present invention, glyphosate (N-(phosphonomethyl)glycine).

The composition may also be, in some embodiments of the present invention, a combination of glyphosate with phosphorous acid or a salt thereof.

In another embodiment of the present invention, a copper- or copper-zinc composition with phosphorous acid combined with sodium nitrite for producing nitrous acid and nitrogen oxides results in antimicrobial (bactericidal, fungicidal), and sporicidal and scleroticidal compositions with applications for agriculture.

In some embodiments of the present invention, the nitrous acid salt is sodium or potassium. In some embodiments of the present invention, the copper salt may be copper oxychloride or copper sulfate. In some embodiments of the present invention, the copper salt may be copper or chloride in the form of a wettable product. In some embodiments of the present invention, the zinc salt may be zinc sulphate, zinc acetate or zinc nitrate. In some embodiments of the present invention, the basic ammonium salt may be ammonium hydroxide, sodium hydroxide or potassium hydroxide, ammonium hydroxide being preferred. In some embodiments of the present invention, the water may be distilled water, deionized water, purified water, filtered water, pharmaceutical grade water, medical grade water, and reverse osmosis water. In some embodiments of the present invention, the copper and/or zinc salt used to make the solution is hydrated. In some embodiments of the present invention, the ratio of copper to zinc in the composition is in the range of 100:1 to 1:100, more preferably 10:1 to 1:10, and even more preferably 1:1. In some embodiments of the present invention, the composition further comprises auxiliaries, adjuvants, carriers, surfactants or extenders.

Surprisingly, there is a more potent antimicrobial/fungicidal and sporicidal activity of Cu/CuZn with phosphorous acid (PA) compositions than with phosphorous acid (PA) only, whether used alone or when mixed with a nitrite salt. The phosphorous acid also stimulates plant defenses.

A surprising enhancement of the sporicidal effect by the presence of copper ions when using phosphorous acid as the activator of $NaNO_2$ for agricultural applications was not foreseeable. Furthermore, the fungicidal experiments herein show that the enhanced antimicrobial effect afforded by the presence of copper with phosphorous acid was an unpredicted synergistic effect.

However, while phosphorous acid and potassium phosphite alone are very effective inhibitors of sclerotia formation by *R. solani*, (at concentrations of 40 mg/L and higher), they are relatively weak inhibitors of fungal growth ($IC_{50}$ values with *R. solani* are around 250 and 400 mg/L, respectively) and neither product alone is sporicidal or scleroticidal at concentrations less than the 4 grams/liter typically used as a foliar spray. Therefore, so there are considerable advantages to using one of the compositions described herein, with or without sodium nitrite, in the field.

Interestingly, when used as a foliar spray on rice seedlings and rose plants, the compositions combined with sodium nitrite were not phytotoxic and, on rose plants infested with aphids, the combination was found to be rapidly insecticidal.

Ideally, agrochemicals should be easy and safe to use, environmentally-friendly, as well as being inexpensive and effective. The present compositions combined with sodium nitrite are advantageous in this respect since the compositions are inexpensive and relatively safe to use and environmentally-friendly since they contain much lower levels of copper (around 10-times less at a 1% dilution of stock solution) than most currently available copper-based agrochemicals.

What is claimed is:

1. An antimicrobial composition comprising the constituents:

copper sulfate in water at a concentration of 20 grams/liter of elemental copper;

zinc sulfate in the water at a concentration of 20 grams/liter of elemental zinc;

phosphorous acid in the water at a concentration of 40 grams/liter;

ammonium hydroxide in the water at a concentration of 7.6 grams/liter; and sodium nitrite in the water at a concentration of 10 millimolar;

wherein the composition has synergistic antifungal properties greater than the antifungal properties of each of the constituents.

2. The composition of claim 1, further comprising additional water diluting the respective concentrations of each constituent to between 0.3 percent and 1 percent of that constituent concentration of claim 1.

3. An antimicrobial composition comprising the constituents:

copper sulfate in water at a concentration of 25 grams/liter of elemental copper;

phosphorous acid in the water at a concentration of 175 grams/liter;

sodium nitrite in the water at a concentration of between 3 and 30 millimolar;

wherein the composition has synergistic sporicidal properties greater than the sporicidal properties of each of the constituents.

4. The composition of claim 3, further comprising additional water diluting the respective concentrations of each constituent to between 0.3 percent and 1 percent of that constituent concentration of claim 3.

5. An antimicrobial composition comprising the constituents:

copper oxychloride in water at a concentration of 25 grams/liter of elemental copper;

phosphorous acid in the water at a concentration of 175 grams/liter;

sodium nitrite in the water at a concentration of between 3 and 30 millimolar;

wherein the composition has synergistic sporicidal properties greater than the sporicidal properties of each of the constituents.

6. The composition of claim 5, further comprising additional water diluting the respective concentrations of each constituent to between 0.3 percent and 1 percent of that constituent concentration of claim 5.

7. The composition of claim 5, wherein the copper oxychloride is in the form of a wettable powder comprising bentonite.

8. An antimicrobial composition comprising:

copper sulfate in water at a concentration of 25 grams/liter of elemental copper;

phosphorous acid in the water at a concentration of 175 grams/liter;

sodium nitrite in the water at a concentration of between 3 and 30 millimolar;

wherein the composition has synergistic scleroticidal properties greater than the scleroticidal properties of each of the constituents.

9. The composition of claim 8, further comprising additional water diluting the respective concentrations of each constituent to 1 percent of that constituent concentration of claim 8.

10. The composition of claim 8, further comprising ammonium hydroxide in the water at a concentration of 11 grams/liter.

11. An antimicrobial composition comprising:
copper oxychloride in water at a concentration of 25 grams/liter of elemental copper;
phosphorous acid in the water at a concentration of 175 grams/liter;
sodium nitrite in the water at a concentration of between 3 and 30 millimolar;
wherein the composition has synergistic scleroticidal properties greater than the scleroticidal properties of each of the constituents.

12. The composition of claim 11, further comprising additional water diluting the respective concentrations of each constituent to 1 percent of that constituent concentration of claim 11.

13. The composition of claim 11, further comprising ammonium hydroxide in the water at a concentration of 11 grams/liter.

\* \* \* \* \*